INVENTOR
Edwin Miller
By Archworth Martin
His Attorney

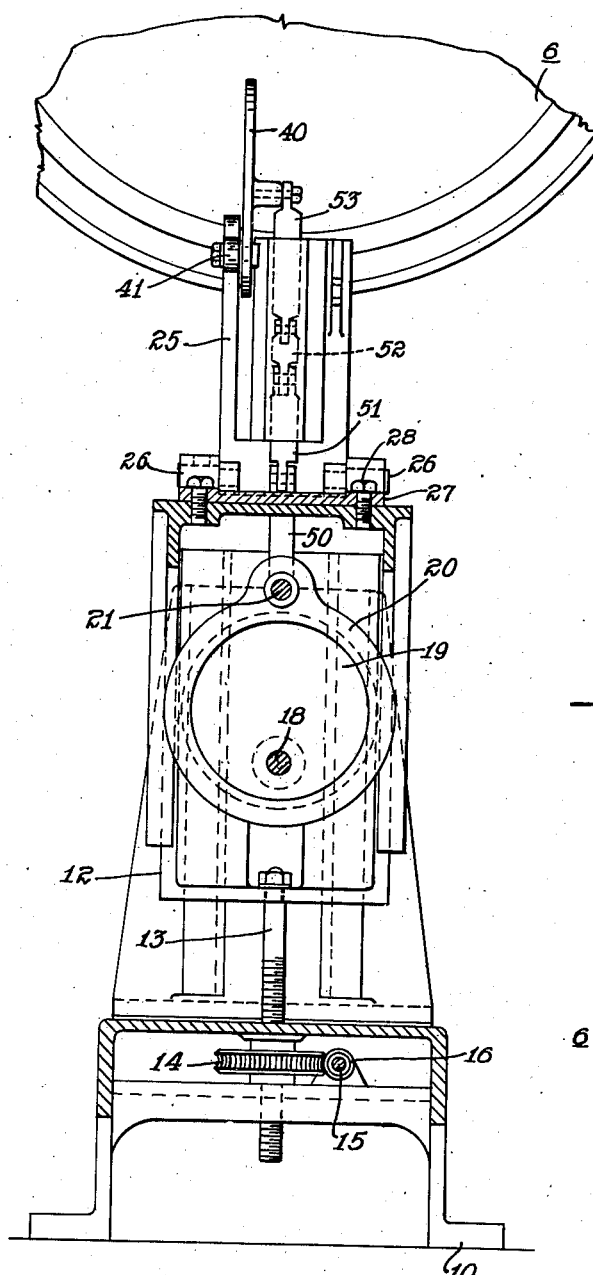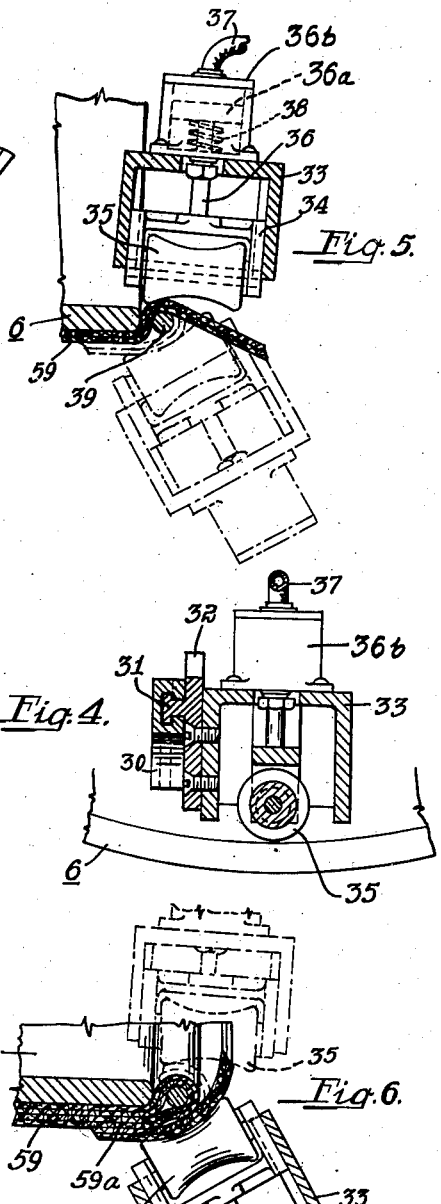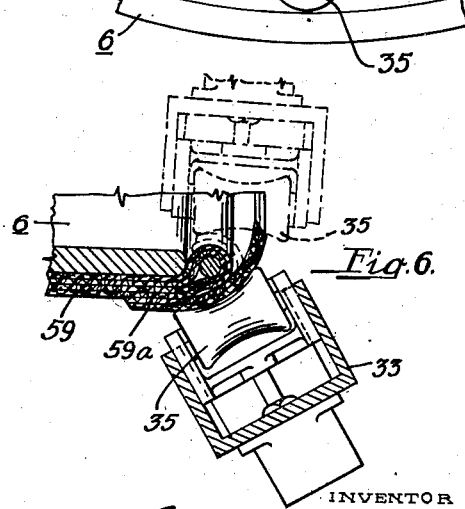

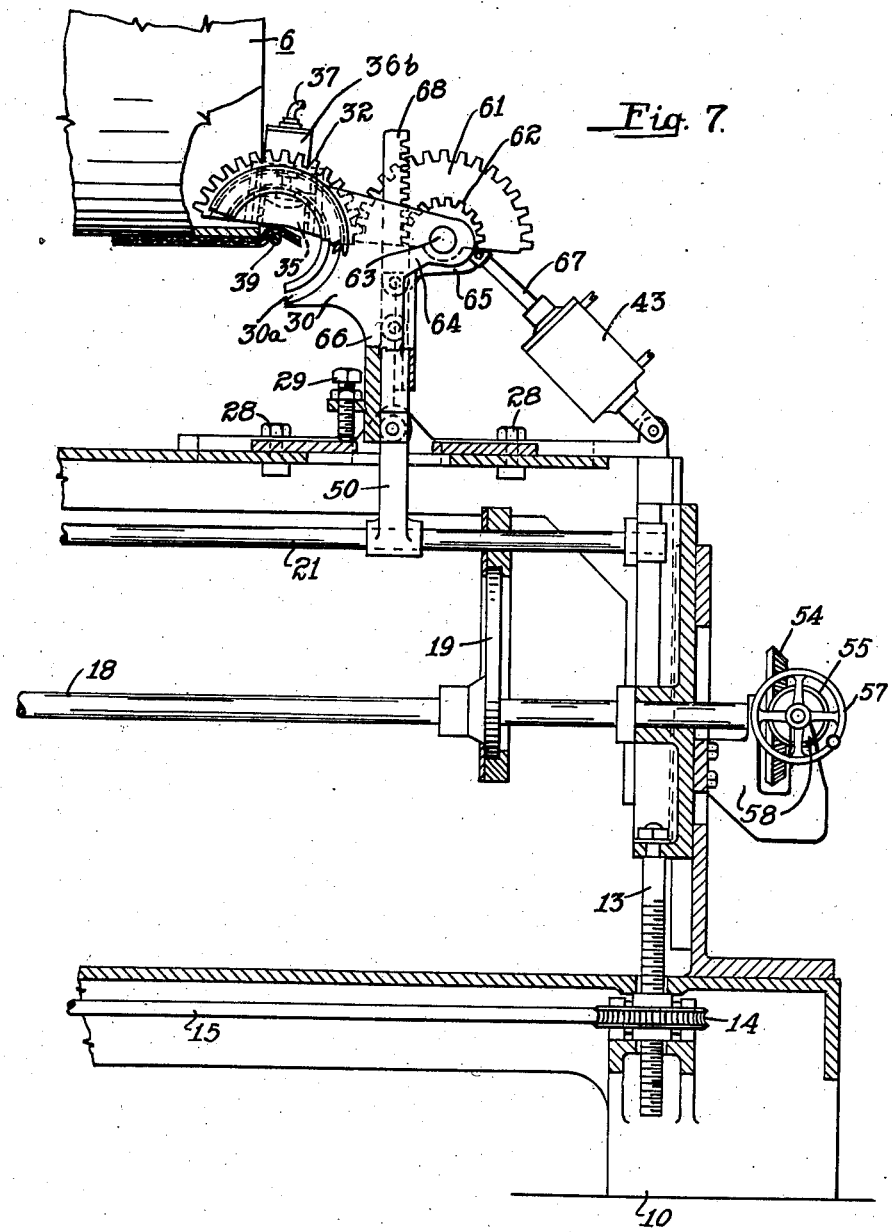

Patented May 25, 1943

2,320,190

UNITED STATES PATENT OFFICE 2,320,190

TIRE BUILDING APPARATUS

Edwin Miller, Jeannette, Pa.

Application May 23, 1941, Serial No. 394,843

9 Claims. (Cl. 154—10)

My invention relates to tire-building apparatus, and more particularly to apparatus for folding the bead margins of the plies of tire fabric about the bead cores and stitching them into place.

The invention is particularly applicable to that method of tire building which involves the use of a rotatable drum upon which the plies of tire fabric are placed, for the purpose of pressing or folding the fabric around the tire beads and applying the rubber tread.

One object of my invention is to provide an improved arrangement of mechanism of the character referred to, whereby the edge portions of the tire fabric can be folded smoothly about the bead cores and stitched into place by a single tool.

More specifically, this invention constitutes an improvement upon that described and claimed in my Patent No. 2,228,774, issued Jan. 14, 1941.

Figure 1:
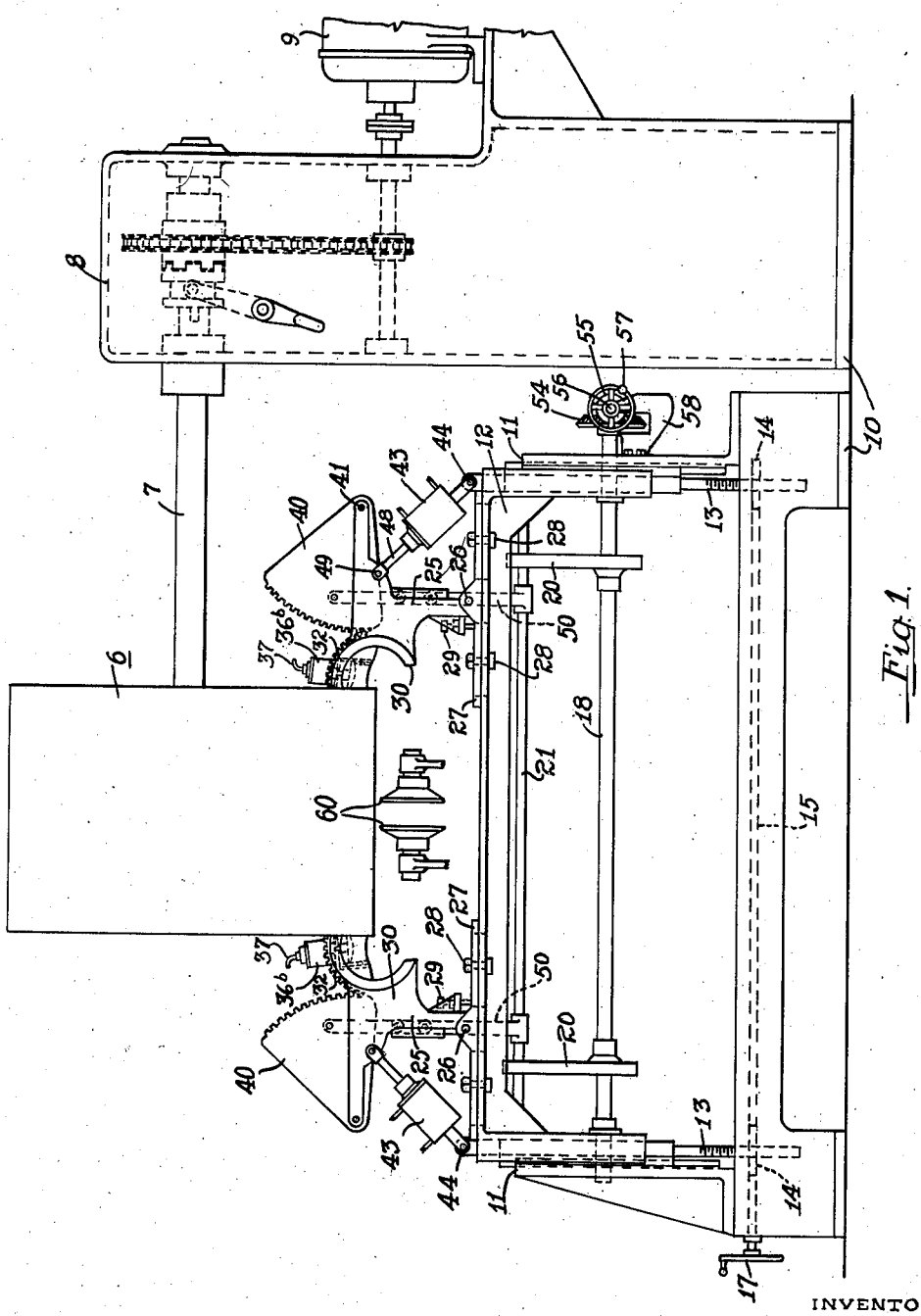
Figure 2:
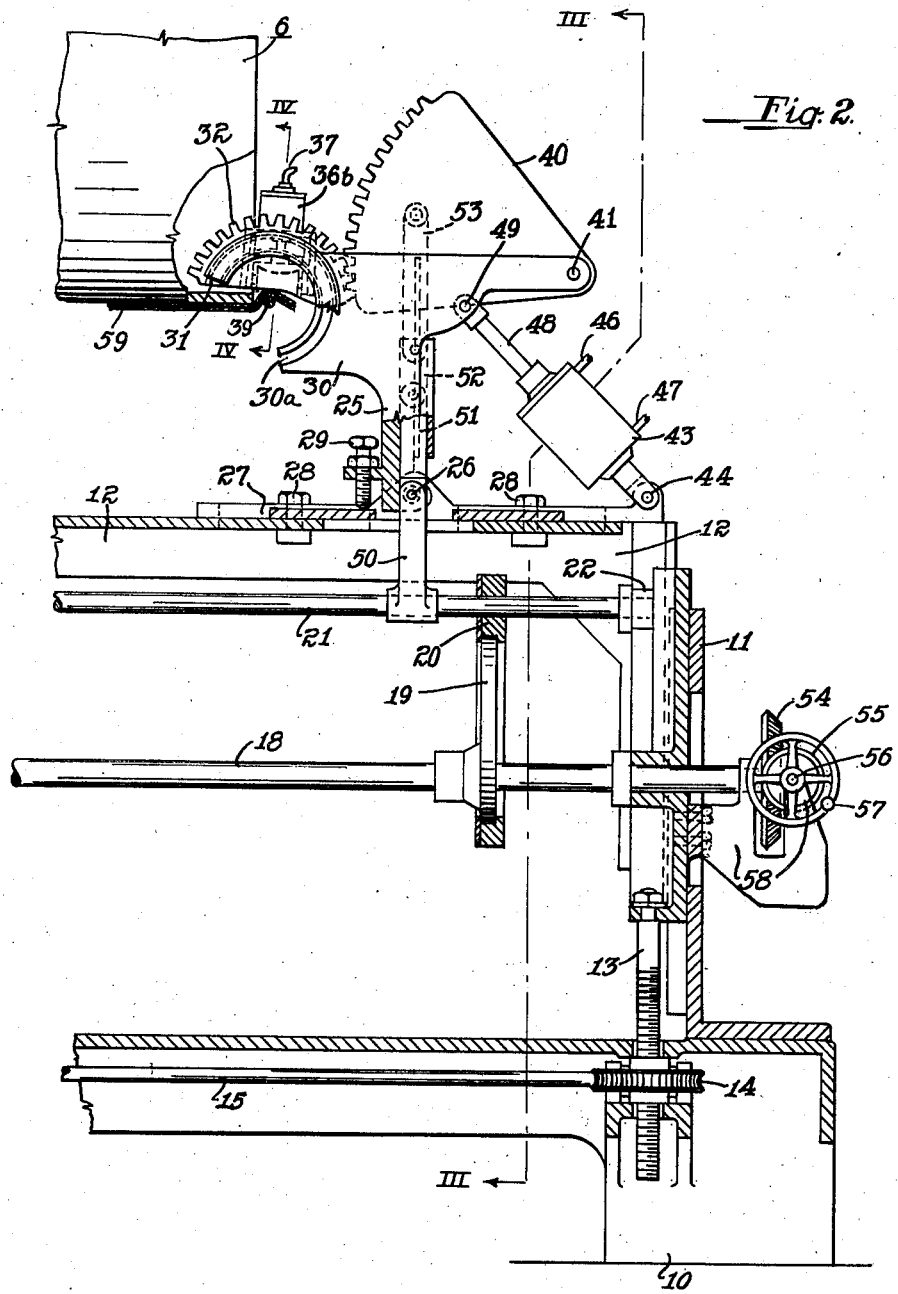

In the accompanying drawings Figure 1 is a face view of the machine; Fig. 2 is a vertical sectional view on an enlarged scale, of the mechanism which operates at one side of the tire drum; Fig. 3 is a view taken on the line III—III of Fig. 2, but with certain of the parts omitted; Fig. 4 is an enlarged view taken on the line IV—IV of Fig. 2; Fig. 5 is an enlarged view of a portion of the apparatus of Fig. 2, showing certain of the parts at one stage of operation; Fig. 6 is a similar view but showing such parts at an intermediate position when moving from the periphery of the drum toward the end thereof, and Fig. 7 shows a modification of the apparatus of Figs. 1 to 3.

The apparatus is shown as employed in connection with a tire-building drum or form 6 which is rotated during the operation of placing the fabric plies and the rubber tread thereon, the drum being of the usual collapsible type and well known in the art. The drum is mounted upon a shaft 7 which is supported by a housing 8 and is driven through conventional driving mechanism from a motor 9.

The structure comprises a foundation base 10 having upstanding slideways 11 for supporting a base plate 12 that is supported by screw threaded adjusting rods 13 that have threaded engagement with the hubs of worm gear wheels 14. A shaft 15 is journaled in the base 10 and carries worms 16 that mesh with the gear wheels 14, so that when the shaft 15 is turned by its handle 17 the base plate 12 will be raised or lowered for the purpose of adapting the apparatus to drums of various diameters, it being seen that vertically-extending leg portions of the base plate 12 are movable vertically on the slideways 11.

A shaft 18 is journaled in the depending end portions of the base plate 12 and carries an eccentric disc 19 that is surrounded by an eccentric ring 20. The eccentric rings 20 support a shaft 21 which has bushings or bosses 22 on its ends that are slidable in vertical grooves 23 formed in the depending portions of the base plate 12, so that as the shaft 18 rotates, the shaft 21 and the links carried thereby will be reciprocated vertically relative to the base plate 12.

A pair of brackets 25 are pivotally connected at 26 to a slide plate 27 that is adjustible on the base plate 12 by means of bolts 28, so that the brackets can be adjusted with relation to drums of various widths. Adjusting screws 29 are provided on the brackets 25 for limiting the extent to which said brackets can be tilted toward the sides of the drum. Each bracket at its upper portion has a laterally-extending arm 30 that is slotted at 30a to engage with a T-shaped rib 31 carried by a segmental gear element 32, the slotted portion 30a and the rib 31 being curved coaxially of a tire bead 39 about which the fabric is to be wrapped. A portion of the face of the member 30 is broken away in Figs. 2 and 7 to expose the slot.

A roller casing 33 is secured to the gear element 32 and a yoke 34 is slidably supported in the casing to carry a loosely-journaled roller 35. A piston rod 36 is connected with the yoke 34 and with a piston 36a in a cylinder 36b which is secured to the outer end of the casing 33. Fluid pressure is admitted to the outer side of the piston through a pipe 37 from a suitable source of supply, to yieldably urge the roller 35 against the tire bead, against the pressure of a spring 38. When the fluid pressure is cut off, the spring will move the roller away from the tire bead.

A segmental gear element 40 is pivotally connected at 41 to the bracket 25 and meshes with the gear element 32, so that when the gear 40 is oscillated, the gear element 32 and the roller 35 will be oscillated about the bead wire 39 as a center. A cylinder 43 is pivotally connected at 44 to the plate 27 and contains a piston which, when fluid pressure is admitted and exhausted through pipes 46 and 47, will reciprocate a rod 48 that is pivotally connected at 49 to the bracket 25. This permits the brackets 25 to be swung into and from operative position with respect to the tire drum 6.

Arms 50 are loosely supported on the shaft 21, so that they will slide thereon when the plates 27 are adjusted axially of the drum, and have pivotal connection through a succession of links 51, 52 and 53 with the segmental gear member 40, the links having vertical movement in a slideway formed in the brackets 25. It will thus be seen that as the shaft 21 is reciprocated by the eccentrics, the segmental gear wheel 40 will be oscillated and impart oscillatory movements to the roller cage 33 to rock it in arcuate paths about the bead 39 as indicated in Figs. 5 and 6.

The shaft 18 may be power driven in order to effect these movements, as in my said patent, but in this instance I have shown it operated manually. To this end the shaft carries a bevel gear wheel 54 that meshes with a bevel pinion 55. The pinion 55 is carried on a shaft 56 that is journaled in a bracket 58 carried by the base 12 and at its outer end has a hand wheel 57 whereby the operator may turn the eccentric disc 19 to effect oscillation of the roller cage 33 during the process of wrapping plies of fabric 59 around a bead and stitching them at the peripheral surface of the drum.

Stitcher wheels 60 of conventional form are provided for stitching the fabric plies in place upon the intermediate peripheral portions of the drum, these stitcher wheels being moved along the face of the drum in any conventional manner.

In Fig. 7 I show an arrangement wherein the segmental gear wheel 32 and its associated parts are of the same form as shown in the other figures, but in this instance a segmental gear wheel 61 is of somewhat different form and is operated in a somewhat different manner than is the gear segment 40. The gear segment 61 is formed unitarily with a gear segment 62, so that they turn as a unit. These gear segments are mounted on a shaft 63 whose ends are journaled in arms 64 and 65 of a bracket 66 that corresponds to the bracket 25, the arm 65 being at the rear side of the segments and the arm 64 at the front side thereof. A piston rod 67 is pivotally connected to the rear arm 65 of the bracket and is reciprocated to rock the bracket 66 in the same manner as the bracket 25 is rocked.

The segmental gear wheel 62 functions as a pinion and meshes with a rack 68 that has link connection with the arm 50 of the shaft 21, so that as the shaft 21 is raised and lowered, the gear 32 and the roller cage will be oscillated to the positions shown in Figs. 5 and 6.

With reference to both of the foregoing forms of the invention, an important feature of distinction over the structure of my previous patent resides in the fact that, in the present instance, it is not necessary to reciprocate the brackets 25 in directions radially of the tire drum 8, in order to effect oscillatory movements of the roller 35 to the positions shown in Figs. 5 and 6, to effect proper wrapping of fabric plies around the bead core. Therefore, in the present instance, I am enabled to omit certain of the operating parts shown in my said patent.

Briefly stated, the operation of the wrapping and stitching rollers 35 is as follows: Impregnated fabric plies 59 are first placed upon the drum 6 and stitched together by stitching rollers 60 or in another suitable manner, whereupon the edges of the plies are bent to permit placing of the bead wires 39. Fluid pressure is admitted to the lower end of the cylinders 43 to swing the brackets 25 toward the drum 6, thus bringing the rollers 35 into the position shown in Figs. 2 and 5. Thereupon fluid pressure is admitted to the cylinders 36b to press the rollers against the fabric. The operator will then turn the hand wheel 57 to lower the shaft 21 and thereby rock the roller casings 33 about the bead wires 39 as axes to swing said roller casings from the position shown in Fig. 5 to and past that shown in Fig. 6. This will wrap the projecting edges of the fabric plies outwardly around the bead and stitch them into place at the periphery of the drum.

Air pressure will then be admitted to the upper ends of the cylinders 43 to swing the brackets 25 away from the drum and to permit placing of additional plies 59a, whereupon the rollers 35 will again be brought into position against the periphery of the drum and moved past the full line position shown in Fig. 6 to the dotted line position, thereby wrapping and stitching these additional plies into place, it being understood that the drum 6 is being constantly driven during these wrapping and stitching operations and will make a considerable number of revolutions during each cycle of folding and stitching movement by the rollers. The fabric is thus gradually folded about the bead core with a minimum danger of wrinkling and creasing and is simultaneously stitched in place.

I claim as my invention:

1. Tire-building apparatus comprising a rotatably-supported tire-building drum for receiving the fabric plies of a tire, with the edges of the fabric projecting axially beyond the sides of the drum, in position to receive bead cores of annular shape that are disposed peripherally of the fabric, a roller positioned adjacent to each side of the said drum, with its axis normally extending in the same general direction as the axis of the drum, means for moving the roller into position to press the projecting fabric in a radially-outward direction against the bead core, and means for continuously tilting the roller about a fixed axis and about the adjacent portion of the bead core as a fixed center, while it is maintained in said pressing engagement with the fabric, through an arcuate path that extends from the side of the drum to the periphery thereof.

2. The combination with a rotatably-mounted, approximately flat tire-building drum for receiving fabric plies of a tire, of mechanism comprising a tool for wrapping the edges of the fabric around a bead core, a support for the tool, and means for tilting the tool on its support, about a fixed axis and about the adjacent portion of the bead core as a fixed center, through an arcuate path of approximately 180° beginning at a point adjacent to the inner periphery of the core and terminating at the face of the drum, to wrap a layer of fabric around the core.

3. The combination with a rotatably-mounted, approximately flat tire-building drum for receiving fabric plies of a tire, of mechanism comprising a tool for wrapping the edges of the fabric around a bead core, means for continuously tilting said tool about a fixed axis and about the adjacent portion of the bead core as a fixed center through an arcuate path of approximately 180°, beginning at a point adjacent to the inner periphery of the core and terminating at the face of the drum, to wrap a layer of fabric around the core, means for withdrawing the tool from fabric-wrapping position, and means for returning the tool to fabric-wrapping position, for movement beginning at a point adjacent to the peripheral face of the drum and terminating at a point adjacent to the inner periphery of the bead core to wrap the edge of a subsequently-applied layer of fabric around the core.

4. The combination with a rotatably-mounted, approximately flat tire-building drum for receiving fabric plies of a tire, of mechanism comprising a tool for wrapping the edges of the fabric around a bead core, means for continuously moving said tool about a fixed axis and about the adjacent portion of the bead core as a fixed center, and through an arcuate path of approximately 180°, beginning at a point adjacent to the inner periphery of the core and terminating at the face of the drum, to wrap a layer of fabric around the core, and means for yieldably maintaining uniform pressure against the tool during said movement.

5. The combination with a rotatably-mounted tire-building drum for receiving fabric plies of a tire in position to support a bead core at an end of the drum, of mechanism comprising a tool for wrapping the edges of the fabric around the bead core, an arcuate guide disposed coaxially of the adjacent portion of the bead core, and means for moving said tool along said guide, while maintaining it in engagement with the fabric, the path of movement extending from the inner peripheral surface of the bead to the outer peripheral surface thereof.

6. The combination with a rotatably-mounted tire-building drum for receiving fabric plies of a tire in position to support a bead core at an end of the drum, of mechanism comprising a tool for wrapping the edges of the fabric around the bead core, an arcuate guide disposed coaxially of the adjacent portion of the bead core, means for moving said tool along said guide, while maintaining it in engagement with the fabric, the path of movement extending from the inner peripheral surface of the bead to the outer peripheral surface thereof, and means for tilting the guide and the tool toward and away from the adjacent side of the drum.

7. The combination with a rotatably-mounted tire-building drum for receiving fabric plies of a tire in position to support a bead core at an end of the drum, of mechanism comprising a tool for wrapping the edges of the fabric around the bead core, an arcuate guide disposed coaxially of the adjacent portion of the bead core, means for moving said tool along said guide, while maintaining it in engagement with the fabric, the path of movement extending from the inner peripheral surface of the bead to the outer peripheral surface thereof, and means for adjusting the guide and the tool radially of the drum.

8. The combination with a rotatably-mounted tire-building drum for receiving fabric plies of a tire in position to support a bead core at an end of the drum, of mechanism comprising a tool for wrapping the edges of the fabric around the bead core, an arcuate guide disposed coaxially of the adjacent portion of the bead core, means for moving said tool along said guide, while maintaining it in engagement with the fabric, the path of movement extending from the inner peripheral surface of the bead to the outer peripheral surface thereof, and means for adjusting the guide and the tool axially of the drum.

9. The combination with a rotatably-mounted tire-building drum for receiving plies of a tire in position to support a bead core at an end of the drum, of mechanism comprising a tool for wrapping the fabric around the bead core, a toothed gear carrying the tool, a curved guide element carried by the gear, a stationary guide element of curved contour supporting the first-named guide element, the said gear and guide elements being disposed coaxially of the adjacent portion of the bead core, and a pinion device for oscillating the gear and the first-named guide element about their axis, while the tool is supported by the gear in position to hold the fabric against the bead.

EDWIN MILLER.